US009858592B2

(12) United States Patent
Osogami

(10) Patent No.: US 9,858,592 B2
(45) Date of Patent: *Jan. 2, 2018

(54) GENERATING APPARATUS, GENERATION METHOD, INFORMATION PROCESSING METHOD AND PROGRAM

(71) Applicant: International Business Machines Corporation, Armonk, NY (US)

(72) Inventor: Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/748,264

(22) Filed: Jun. 24, 2015

(65) Prior Publication Data

US 2015/0294354 A1  Oct. 15, 2015

Related U.S. Application Data

(63) Continuation of application No. 14/633,414, filed on Feb. 27, 2015.

(30) Foreign Application Priority Data

Mar. 14, 2014 (JP) ................................. 2014-052154

(51) Int. Cl.
 *G06Q 30/02* (2012.01)
(52) U.S. Cl.
 CPC ............................... *G06Q 30/0254* (2013.01)
(58) Field of Classification Search
 CPC ................ G06Q 10/04; G06C 30/0201; G06C 30/0242; G06C 30/0254

(Continued)

(56) References Cited

U.S. PATENT DOCUMENTS 5,946,673 A    8/1999  Francone et al.
6,466,908 B1  10/2002  Baggenstoss
 (Continued)

FOREIGN PATENT DOCUMENTS

JP    2008152321 A    7/2008
JP     201105375 A    3/2011
 (Continued)

OTHER PUBLICATIONS

Pineau, Joelle; Gordon, Geoff and Thrun, Sebastian,"Point-based value iteration: An anytime algorithm for POMDPs, International Joint Conference Artificial Intelligence, 2003, "http://www.cs.cmu.edu/~ggordon/jpineau-ggordon-thrun.ijcai03.pdf.*

(Continued)

*Primary Examiner* — Renae Feacher
(74) *Attorney, Agent, or Firm* — Jay Wahlquist

(57) ABSTRACT

A generating apparatus generates a set of gain vectors with respect to a transition model having observable visible states and unobservable hidden states and expressing a transition from a present visible state to a subsequent visible state according to an action, the set of gain vectors being generated for each visible state and used for calculation of a cumulative expected gain at and after a reference point in time, the apparatus including a setting section for setting, with respect to each hidden state, a probability distribution over the hidden states for selection used to select vectors to be included in the set of gain vectors from the gain vectors including a component for a cumulative gain, and a selection section for including, in the set of gain vectors, with priority, the gain vector giving the maximum of the cumulative expected gain with respect to the probability distribution for selection.

13 Claims, 13 Drawing Sheets

(58) Field of Classification Search
USPC .......................................... 705/7.11, 29, 37
See application file for complete search history.

(56) References Cited

U.S. PATENT DOCUMENTS

| | | | |
|---|---|---|---|
| 8,478,642 B2 | 7/2013 | Dey et al. | |
| 2003/0101449 A1* | 5/2003 | Bentolila | G06Q 30/0251 725/10 |
| 2004/0015386 A1 | 1/2004 | Abe et al. | |
| 2004/0073764 A1 | 4/2004 | Andreasson | |
| 2005/0071223 A1* | 3/2005 | Jain | G06Q 30/02 705/14.13 |
| 2006/0100874 A1 | 5/2006 | Oblinger et al. | |
| 2008/0147485 A1* | 6/2008 | Osagami | G06Q 30/0202 705/7.31 |
| 2010/0094786 A1 | 4/2010 | Gupta et al. | |
| 2011/0016067 A1 | 1/2011 | Levchuk et al. | |
| 2011/0214006 A1* | 9/2011 | Meek | G06F 11/0709 714/2 |
| 2011/0313933 A1 | 12/2011 | Dai et al. | |
| 2012/0053945 A1 | 3/2012 | Gupta et al. | |
| 2012/0310872 A1* | 12/2012 | Anderson | G06Q 40/06 706/46 |
| 2013/0085983 A1* | 4/2013 | Osogami | G06N 99/005 706/52 |
| 2013/0185039 A1 | 7/2013 | Tesauro et al. | |
| 2013/0262013 A1 | 10/2013 | Ide et al. | |
| 2013/0318023 A1 | 11/2013 | Morimura | |
| 2015/0100530 A1 | 4/2015 | Mnih et al. | |

FOREIGN PATENT DOCUMENTS

| | | |
|---|---|---|
| JP | 20120123529 A | 6/2012 |
| JP | 2012190062 A | 10/2012 |

OTHER PUBLICATIONS

Anita Luo and V. Kumar, "Recovering Hidden Buyer-Seller Relationship States to Measure the Return on Marketing Investment in Business-to-Business Markets," Journal of Marketing Research, vol. L (Feb. 2013), 143-160.*

Tanya Mark; Katherine N. Lemmon; and Mark Vandenbosch, "Customer Migration Patterns: Evidence from a North American Retailer," Journal of Marketing Theory and Practice, vol. 22, No. 3 (summer 2014), pp. 251-269.*

List of IBM Patents or Patent Applications Treated as Related; JP920140003US2, Date File: Jun. 24, 2015, pp. 1-2.

Takayuki Osogami, "Generating Apparatus, Generation Method, Information Processing Method and Program," U.S. Appl. No. 14/633,414; filed Feb. 27, 2015.

Takayuki Osogami, "Generating Apparatus, Selecting Apparatus, Generation Method, Selection Method and Program," U.S. Appl. No. 14/633,404, filed Feb. 27, 2015.

Takayuki Osogami, "Generating Apparatus, Selecting Apparatus, Generation Method, Selection Method and Program," U.S. Appl. No. 14/748,265, filed Jun. 24, 2015.

Petrik et al., "Average-Reward Decentralized Markov Decision Processes", IJCAI, 2007. 6 pages.

Netzer et al., "A Hidden Markov Model of Customer Relationship Dynamics", Marketing Science 27.2 (2008) 55 pages.

Hasinoff, "Reinforcement Learning for Problems with Hidden State", University of Toronto, Technical Report, 2002. 18 pages.

Li, "Hidden Markov Model", Department of Statistics, the Pennsylvania State University, Nov. 21, 2008. 62 pages.

Monahan, "State of the Art-A Survey of Partially Observable Markov Decision Processes: Theory, Models, and Algorithms", Management Science, vol. 28, No. 1, Jan. 1982. 18 pages.

Dsogami, "Robust partially observable Markov decision process", Proceedings of the 32nd International Conference on Machine Learning, Lille, France, 2015. JMLR: W&CP vol. 37. 10 pages.

* cited by examiner

Transition from visible state S2 to another visible state at time t by action a

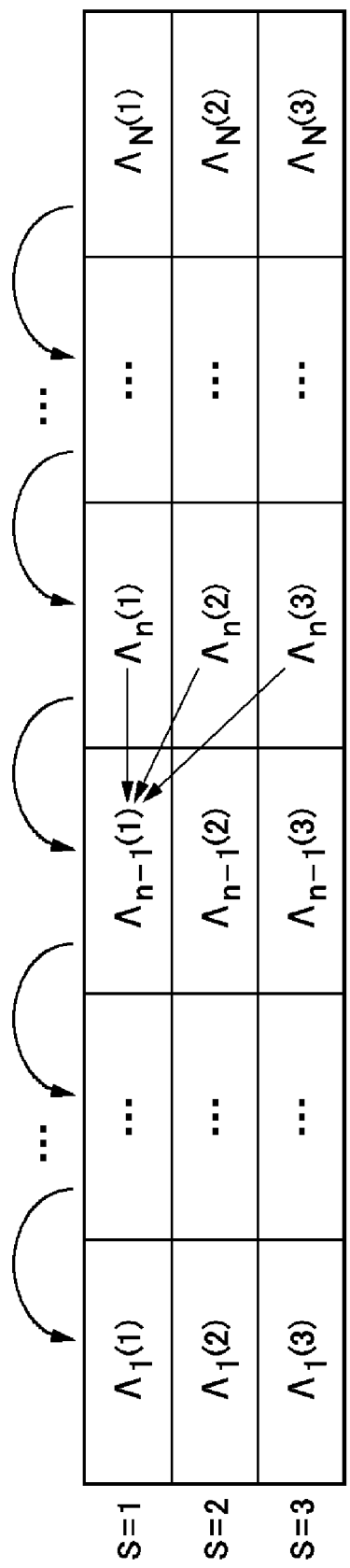

Figure 5

1: Input: $s, \{\Lambda^*_{t,n+1} \mid t \in S\}$
2: $\Lambda^*_{s,n} \leftarrow \emptyset$
3: for all $a \in A$ do
4:    $\Lambda^a_{s,n} \leftarrow \emptyset$
5:    for all $(t,z) \in S \times Z$ do
6:       $\Phi \leftarrow \emptyset$
7:       for all $\alpha \in \Lambda^*_{t,n+1}$ do
8:          $\Phi \leftarrow \Phi \cup \left\{ \left( \frac{q^a_s(i)}{|S||Z|} + \gamma\, P^a_{s,i;t,z}\, \alpha(i) \right)_{i \in u} \right\}$
9:       end for
10:      $\Phi = \mathrm{prune}(\Phi)$
11:      $\Lambda^a_{s,n} \leftarrow \mathrm{prune}\left(\{\alpha + \alpha' \mid \alpha \in \Lambda^a_{s,n}, \alpha' \in \Phi\}\right)$
12:    end for
13:    $\Lambda^*_{s,n} \leftarrow \Lambda^*_{s,n} \cup \Lambda^a_{s,n}$
14: end for
15: $\Lambda^*_{s,n} \leftarrow \mathrm{prune}\left(\Lambda^*_{s,n}\right)$
16: Return: $\Lambda^*_{s,n}$ Figure 6(a)
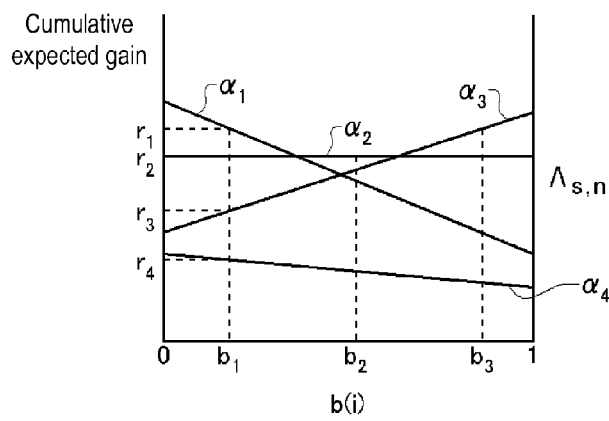
Figure 6(b)
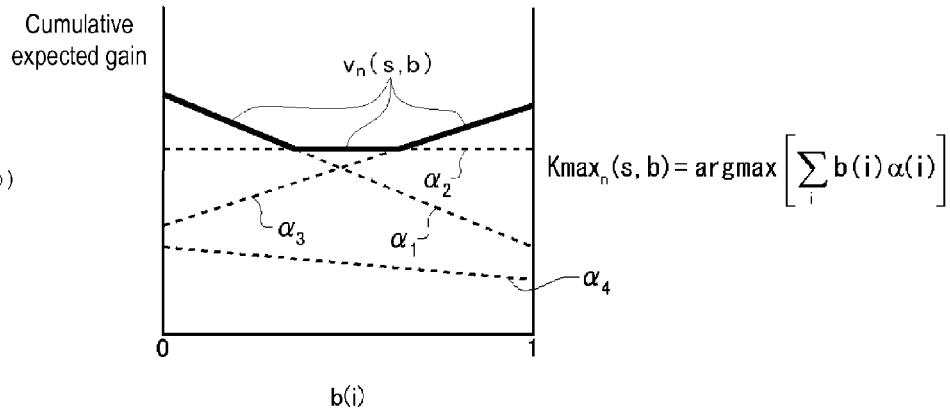

Figure 7

1: for all $s \in S$ do
2: $\quad \Lambda(s,n) \leftarrow \emptyset$
3: $\quad$ for all $a \in A$ do
4: $\quad\quad \Lambda(s,n,a) \leftarrow \emptyset$
5: $\quad\quad$ for all $s' \in S$ do
6: $\quad\quad\quad \Lambda(s,n,a,s') = \text{prune}\left(\left\{\left(\frac{q_{s,i}^a}{|S|} + P_{s,i;s'}^a \, \alpha_i\right)_{i \in B} \mid \alpha \in \Lambda(s', n+1)\right\}\right)$
7: $\quad\quad\quad \Lambda(s,n,a) \leftarrow \text{prune}\left(\{\alpha + \alpha' \mid \alpha \in \Lambda(s,n,a), \alpha' \in \Lambda(s,n,a,s')\}\right)$
8: $\quad\quad$ end for
9: $\quad\quad \Lambda(s,n) \leftarrow \text{prune}(\Lambda(s,n) \cup \Lambda(s,n,a))$
10: $\quad$ end for
11: end for

Figure 11

1: Input: $s, \{\Lambda_{t,n+1} \mid t \in S\}, \mathbf{B}$
2: for all $(a,t,z) \in A \times S \times Z$ do
3: $\quad \Theta_{t,z}^a \leftarrow \{(p_{s,i;t}^a \alpha | \alpha(i))_{i \in \mathcal{U}} \in \Lambda_{t,n+1}\}$
4: end for
5: for all $\pi \in \prod$ do
6: $\quad \Psi_b \leftarrow \bigcup_{a \in A} \left\{ q_s^a + \gamma \sum_{t \in S} \sum_{z \in Z} \arg\max_{\alpha_{t,z} \in \Theta_{t,z}^a} \{b \cdot \alpha_{t,z}\} \right\}$
7: end for
8: $\Lambda_{s,n} \leftarrow \bigcup_{b \in B} \arg\max_{\alpha \in \Psi b} \{b \cdot \alpha\}$
9: Return: $\Lambda_{s,n}$ Figure 12(a)
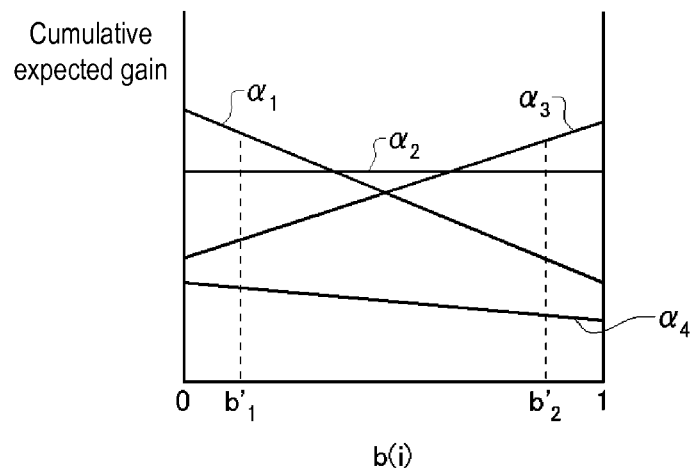
Figure 12(b)
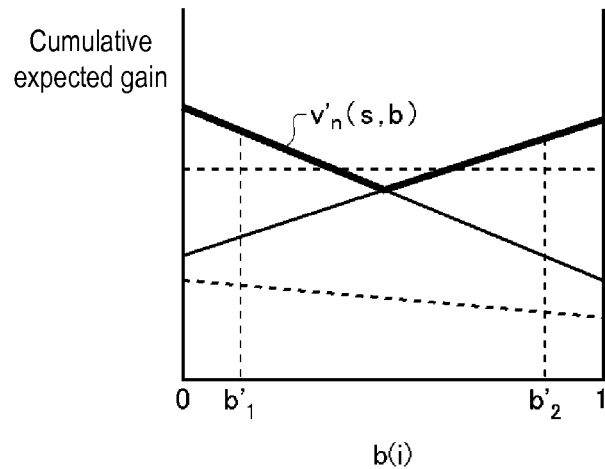

US 9,858,592 B2

GENERATING APPARATUS, GENERATION METHOD, INFORMATION PROCESSING METHOD AND PROGRAM

DOMESTIC AND FOREIGN PRIORITY

This application is a continuation of U.S. patent application Ser. No. 14/633,414, filed Feb. 27, 2015, which claims priority to Japanese Patent Application No. 2014-052154, filed Mar. 14, 2014, and all the benefits accruing therefrom under 35 U.S.C. §119, the contents of which in its entirety are herein incorporated by reference.

BACKGROUND

The present invention relates to a generation method, a selection method and a program.

Sequential decision making in an environment including unobservable states has been formulated as a partially observable Markov decision process (POMDP) (Patent Literatures 1 to 3). In some decision making problems, observability and invariability of states are known, for example, part of the states are completely observable while the other parts are unobservable. Also, in some cases, an unobservable part is invariable. Conventionally, in such a case, an optimum policy is calculated by a general-purpose POMDP solver.

Patent Literature 1—JP2011-53735A
Patent Literature 2—JP2012-123529A
Patent Literature 3—JP2012-190062A

SUMMARY

An aspect of the present invention is to calculate at a high speed an optimum policy in a transition model having completely observable visible states and unobservable hidden states.

According to a first aspect of the present invention, there are provided a generating apparatus arranged to generate a set of gain vectors with respect to a transition model having observable visible states and unobservable hidden states and expressing a transition from a present visible state to a subsequent visible state according to an action, the set of gain vectors being generated for each visible state and used for calculation of a cumulative expected gain at and after a reference point in time, the apparatus including a setting section for setting, with respect to each hidden state, a probability distribution over the hidden states for selection used to select vectors to be included in the set of gain vectors from the gain vectors including a component for a cumulative gain, and a selection section for including, in the set of gain vectors, with priority, the gain vector giving the maximum of the cumulative expected gain with respect to the probability distribution for selection, a generation method using the generating apparatus, and a program.

According to a second aspect of the present invention, there is provided an information processing system including a generating apparatus for generating a set of gain vectors, a selecting apparatus for selecting an optimum action in a transition model having observable visible states and unobservable hidden states and expressing a transition from a present visible state to a subsequent visible state according to an action, the selecting apparatus including an acquisition section for obtaining a set of gain vectors generated by the generating apparatus, a gain selection section for selecting, from the gain vectors according to the present visible state, the gain vector maximizing a cumulative expected gain with respect to a probability distribution over the hidden states at the present point in time, and an action selection section for selecting an action corresponding to the selected gain vector as an optimum action.

The above-described outline of the present invention is not an enumeration of the necessary features of the present invention. Subcombinations of these features may also form the present invention.

BRIEF DESCRIPTION OF THE DRAWINGS

FIG. 4 illustrates an example of a method for generating a set $\Lambda_n(s)$ with a generation section in an exemplary embodiment;

FIG. 5 illustrates an example of a concrete algorithm for the processing flow in FIG. 3;

FIGS. 6(a) and 6(b) illustrate the relationship between a set $\Lambda_{s,n}$ and a cumulative expected gain in an exemplary embodiment;

FIG. 7 illustrates another example of a concrete algorithm for the processing flow in FIG. 3;

FIG. 9 illustrates an outline of an information processing system according to a modified example of;

FIG. 11 illustrates an example of a concrete algorithm for the processing flow in FIG. 10;

FIGS. 12(a) and 12(b) illustrate the relationship between a set $\Lambda_{s,n}$ and a cumulative expected gain in the modified example;

DETAILED DESCRIPTION

The present invention will be described with respect to an embodiment thereof. However, the invention according to the appended claims is not limited to the embodiment described below. Also, not all of possible combinations of features described in the embodiment are indispensable to the solving means according to the present invention.

Figure 1:
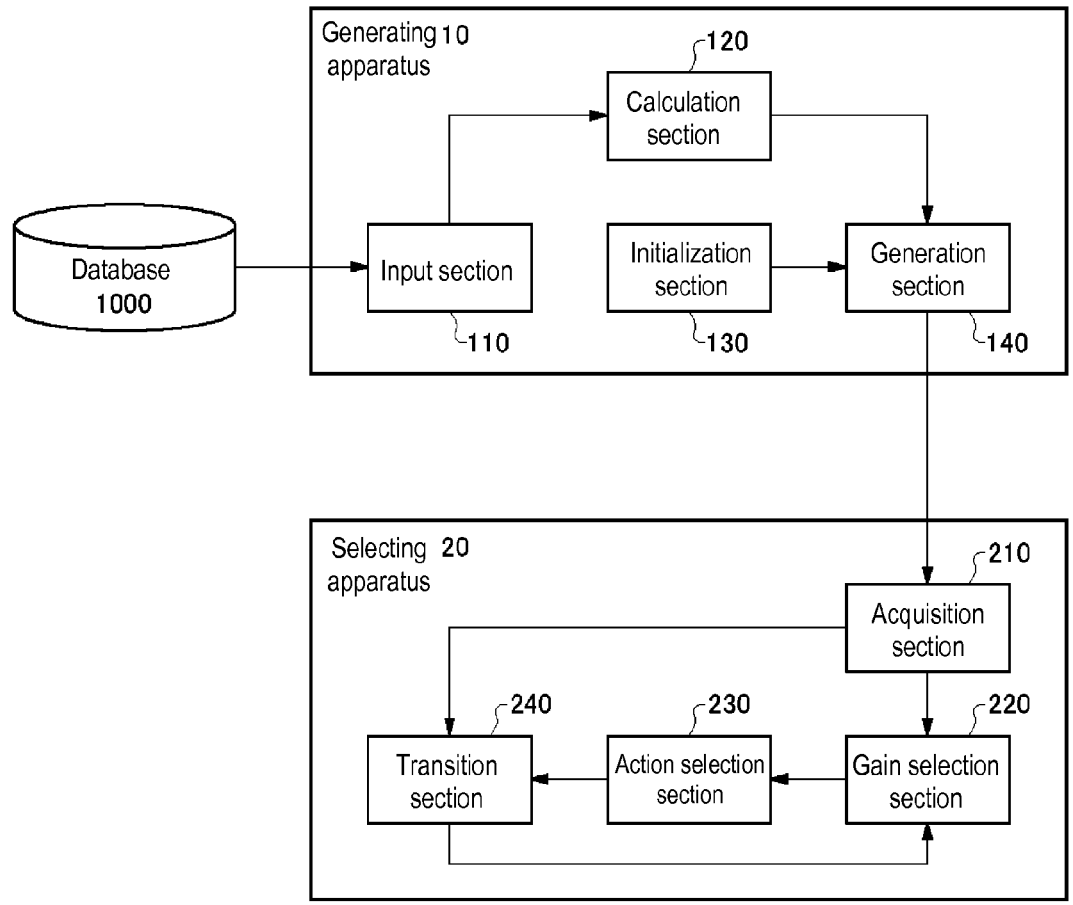
FIG. 1 illustrates an outline of an information processing system according to an exemplary embodiment.

FIG. 1 illustrates an information processing system according to the present embodiment. In the information processing system according to the present embodiment, a set of gain vectors is generated with which a transition model having observable visible states and unobservable hidden states and expressing a transition from a present visible state to a subsequent visible state according to an action and/or a hidden state is formulated and an optimum action is selected on the basis of the set of gain vectors.

For example, whether consumers are in a state after viewing a television commercial of a particular commodity (e.g., a home electric appliance) and whether the consumers are in a state of being interested in the particular commodity are unobservable hidden states, and whether consumers are in a state of having viewed a Web advertisement of a particular commodity is a visible state observable through cookies.

In the information processing system according to the present embodiment, such a transition model is formulated and an action (e.g., a television commercial, direct mail, E-mail, or the like) for optimizing an expected gain (e.g., the sales) obtained from consumers is selected. The information processing system according to the present embodiment has a generating apparatus 10 that generates a set of gain vectors and a selecting apparatus 20 that selects a suitable action according to the set of gain vectors.

The generating apparatus 10 generates, for each of visible states, a set of gain vectors which include, with respect to each of hidden components, a component of a cumulative expected gain determined by adding up expected gains at points in time from a reference point in time to a future point in time on the basis of data for learning, and which can be used for calculation of a cumulative expected gain. The generating apparatus 10 is realized, by example, by executing a piece of software on a computer. The generating apparatus 10 is provided with an input section 110, a calculation section 120, an initialization section 130 and a generation section 140.

The input section 110 is provided with learning data for generating a set of gain vectors from a storage device such as an external database 1000 or an internal section of the generating apparatus 10. The input section 110 provides the learning data to the calculation section 120. The learning data may be, for example, a purchase history and an action history or the like about consumers.

The calculation section 120 calculates, from learning data, for each of visible states, a state transition probability representing a probability of transition from the visible state, and an expected gain which is a gain expected in the visible state according to an action. The calculation section 120 supplies the state transition probability and the expected gain to the generation section 140.

Before a set of gain vectors for one of visible states, which are used in a selecting function, is calculated for the entire time period for a transition model, the initialization section 130 initializes the set of gain vectors at a predetermined future point (e.g., the last point in time in the time period). For example, the initialization section 130 initializes the set of gain vectors for each visible state at a certain future point in time by setting the set of gain vectors as a set of zero vectors. The initialization section 130 provides the initialized set of gain vectors to the generation section 140.

The generation section 140 recursively generates, by retroacting from a future point in time, on the basis of a state transition probability and an expected gain, a set of gain vectors which has at least one gain vector to be used for calculation of a cumulative expected gain at and after a reference point in time and from which the gain vector which gives the maximum of the cumulative expected gain is to be selected. The generation section 140 may generate from the generated set of gain vectors a selecting function for selecting the gain vector which maximizes the cumulative expected gain at the reference point in time. A method for generating a set of gain vectors and other items with the generation section 140 will be described later in detail.

The generation section 140 also generates action association information including associations between actions and gain vectors at the time of generation of a set of gain vectors. The generation section 140 may supply the generated set of gain vectors, the state transition probability and action association information to the selecting apparatus 20. The generation section 140 may supply the selecting function in place of the set of gain vectors to the selecting apparatus 20.

The selecting apparatus 20 selects an optimum action on the basis of a set of gain vectors in a transition model having observable visible states and unobservable hidden states and expressing a transition from a present visible state to a subsequent visible state according to an action and/or a hidden state. For example, the selecting apparatus selects as an optimum action an action to optimize the gain. The selecting apparatus 20 is realized, for example, by executing a piece of software on a computer. The selecting apparatus 20 has an acquisition section 210, a gain selection section 220, an action selection section 230 and a transition section 240.

The acquisition section 210 obtains a set of gain vectors to be used for calculation of a cumulative expected gain after a reference point in time. For example, the acquisition section 210 may obtain a set of gain vectors generated by the generating apparatus 10.

The acquisition section 210 may also obtain a state transition probability and action association information from the generating apparatus 10. The acquisition section 210 supplies the obtained set of gain vectors and action association information to the gain selection section 220. The acquisition section 210 also supplies the state transition probability to the transition section 240.

The gain selection section 220 selects, on the basis of a set of gain vectors, from gain vectors according to the present visible state, the gain vector which maximizes a cumulative expected gain with respect to a probability distribution over hidden states at the present point in time. For example, the gain selection section 220 generates a selecting function for selecting one gain vector from a set of gain vectors, and selects, on the basis of this selecting function, the gain vector which maximizes a cumulative expected gain. The gain selection section 220 supplies the selected gain vector and action association information to the action selection section 230.

The action selection section 230 selects, on the basis of action association information, an action corresponding to the gain vector selected by the gain selection section 220, which is an optimum action. The action selection section 230 selects as an optimum action a policy to maximize the cumulative expected gain, for example. The action selection section 230 supplies the selected action to the transition section 240.

The transition section 240 causes a probabilistic transition of the visible state on the basis of the state transition probability corresponding to the action selected by the action selection section 230 and the present probability distribution over the hidden states. The transition section 240 also updates the probability distribution over the hidden states according to the selected action. The transition section 240 supplies the updated visible state and probability distribution over the hidden states to the gain selection section 220. The gain selection section 220 is again made to select from the gain vectors on the basis of the visible state and the probability distribution over the hidden states.

Thus, in the information processing system according to the present embodiment, a recursive method is applied to a transition model expressing transition of an observable visible state, thereby enabling the generating apparatus 10 to generate a set of gain vectors at a high speed. Also, the selecting apparatus 20 can select an optimum action on the basis of a set of gain vectors generated by the generating apparatus 10.

Figure 2:
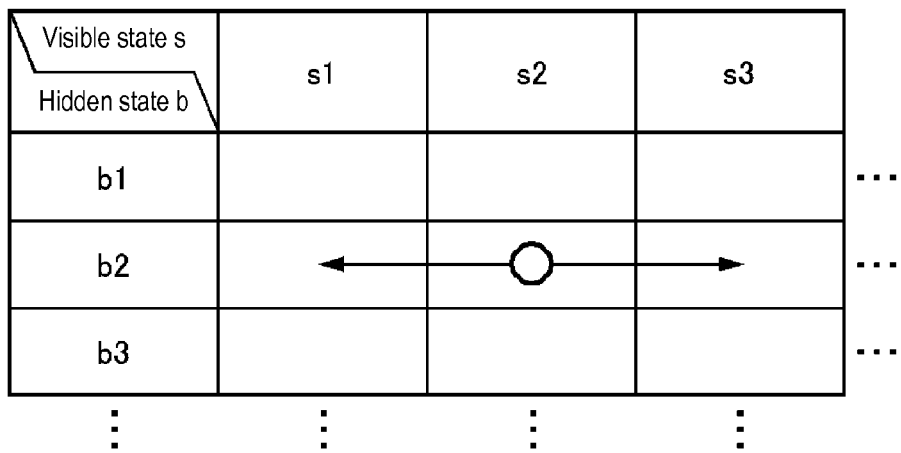
FIG. 2 illustrates an example of a visible state, s and a hidden state b according to an exemplary embodiment.

FIG. 2 illustrates an example of a visible state, s and a hidden state b in a transition model according to the present embodiment. As illustrated, the information processing system according to the present embodiment has observable visible states s1, s2, s3 . . . and unobservable hidden states b1, b2, b3 . . . . In the present embodiment, visible states and hidden states are given independently of each other, as illustrated.

That is, in the present embodiment, some visible state (e.g., visible state s2) and some hidden state (e.g., hidden state b2) are given simultaneously. For example, in a case where an application which outputs a marketing policy to maximize a cumulative expected gain obtained by business transactions with customers on a Web-based selling site is applied to the information processing system according to the present embodiment, a marketing policy taken on customers and a reaction from the customers may be a visible state externally observable, and a hidden state may be a state not directly observable from the outside, e.g., customer's tastes.

In the information processing system according to the present embodiment, a transition model is handled in which transition of a visible state can be made in a time period (e.g., visible state s2→s1 or s3), while no transition is made between hidden states (for example, no transition from hidden state b2 is made).

Since any hidden state is not observable, one hidden state b2 is not identifiable as illustrated in practice; only a probability distribution b {b(i)|i=1, . . . |B|} representing the probability of being in each hidden state i is calculated. In some case, the probability as to identification of the present hidden state is indirectly ascertained as a result of a state transition of a visible state, and a transition of the probability distribution b can occur. For example, if the probability of visible state transition s2→s1 in the hidden state b2 is extremely high, the probability of the hidden state b2 being produced in the probability distribution b at point t+1 in time is increased in correspondence with observation of the visible state s2→s1 from point t in time to point t+1 in time.

Figure 3:
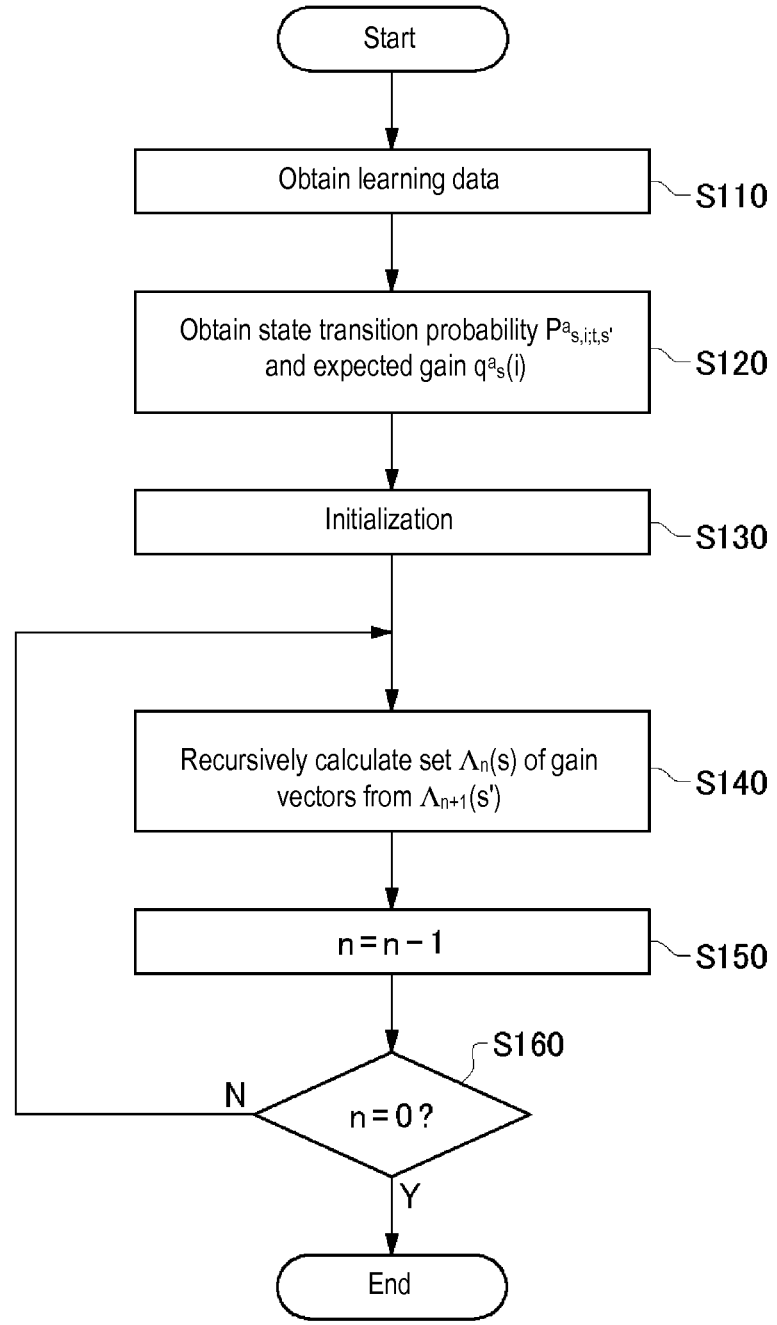
FIG. 3 illustrates a processing flow in a generating apparatus according to an exemplary embodiment.

FIG. 3 illustrates a processing flow in the generating apparatus 10 according to the present embodiment. In the present embodiment, the generating apparatus 10 generates a set of gain vectors by executing processing from S110 to S160.

First, in S110, the input section 110 obtains learning data from the database 1000 provided outside or inside the generating apparatus 10. For example, the input section 110 may be supplied with learning data which is data including visible states, contents of actions and observation results defined in time series.

The input section 110 may alternatively obtain, as learning data, data including no visible states defined. For example, the input section 110 may first obtain, as learning data, policies, such as advertisements provided to a plurality of consumers, and a history of consumer's actions such as purchases of commodities. The input section 110 may subsequently define the visible states by generating a time series of state vectors from the action history or the like and by discretizing the state vectors.

The input section 110 may also obtain, as learning data, data usable for inference of a hidden state. For example, the input section 110 may obtain, as learning data, results of a questionnaire survey in which consumer's tastes for example are described. The input section 110 may define a hidden state by generating feature vectors from question- naire survey results or the like and by discretizing the feature vectors. The input section 110 provides the learning data to the calculation section 120.

In S120, the calculation section 120 calculates a state transition probability and an expected gain from the learning data. For example, the calculation section 120 defines from the learning data one or more visible states s (s∈S) among which a transition can be made and one or more hidden states i (i∈B) among which no transition is made, and calculates a state transition probability $P^a_{s,i;t,z}$ of transition from the visible state, s to a visible state, t and observation of z when an action a is executed in the visible state, s and a hidden state i, and an expected gain $q^a_s(i)$ when the action a is executed in the visible state, s and the hidden state i. The calculation section 120 may calculate the state transition probability $P^a_{s,i;t,z}$ and the expected gain $q^a_s(i)$ by a reinforcement learning method such as Q-learning. The calculation section 120 supplies the calculated state transition probability $P^a_{s,i;t,z}$ and expected gain $q^a_s(i)$ to the generation section 140.

Subsequently, in S130, the initialization section 130 initializes a set $\Lambda_N(s)$ of gain vectors $\alpha_{s,N}$ with respect to the visible state, s at a future point N in time (N: an integer equal to or larger than 2) in a transition model. For example, the initialization section 130 initializes the set $\Lambda_N(s)$ of $\alpha_{s,N}$ by setting the set $\Lambda_N(s)$ as a set $\{(0, \ldots, 0)\}$ consisting of a vector |B| zeros, where |B| denotes the number of hidden states. The initialization section 130 initializes n to n=N−1. The initialization section 130 provides the initialized set $\Lambda_N(s)$ to the generation section 140.

Subsequently, in S140, the generation section 140 generates a set $\Lambda_n(s)$ of gain vectors $\alpha_{s,n}$ from a set $\Lambda_{n+1}(s)$ with respect to n as shown by 1≤n≤N−1. The set $\Lambda_n(s)$ of gain vectors $\alpha_{s,n}$ generated by the generation section 140 includes at least one gain vector $\alpha_{s,n}$ having a component $\alpha_{s,n}(i)$ of a cumulative expected gain with respect to each hidden state i.

FIG. 4 illustrates an example of a method for generating the set $\Lambda_n(s)$ with the generation section 140 in the present embodiment. The generation section 140 recursively generates the set $\Lambda_n(s)$ of gain vectors $\alpha_{s,n}$ with respect to visible state, s (s∈S, S: the set of visible states) at point n in time on the basis of a set $\Lambda_{n+1}(s')$ of gain vectors $\alpha_{s',n+1}$ with respect to each of visible states s' (s'∈S) at subsequent point n+1 in time.

For example, if the visible state s1 includes visible states s1, s2 and s3 as illustrated, the generation section 140 may generate a set $\Lambda_n(1)$ at point n in time from sets $\Lambda_{n+1}(1)$, $\Lambda_{n+1}(2)$, and $\Lambda_{n+1}(3)$ of gain vectors at point n+1 in time. The generation section 140 generates the set of gain vectors on the basis of the state transition probability of transition from one visible state, s to the visible state, s' at point n+1 in time according to the action and the expected gain obtained in the visible state, s' according to the action. A concrete generation method for this will be described later.

The generation section 140 may generate, on the basis of the set $\Lambda_n(s)$ of gain vectors $\alpha_{s,n}$ generated, according to the visible state, s and the probability distribution b over the hidden states, a selecting function $Kmax_n(s, b)$ for selecting the gain vector which maximizes the cumulative expected gain at and after the reference point n in time. For example, the generation section 140 generates a selecting function for selecting the gain vector which maximizes the cumulative expected gain based on the sum of values each determined by multiplying the probability of one hidden state being i in probability distribution b by one of the components of the gain vectors.

As an example, the generation section 140 generates a selecting function $Kmax_n(s, b)$ shown by expression (1), where b(i) represents the probability of the hidden state being i in the probability distribution over the hidden states and $\alpha_{s,n}^{k}(i)$ represents the component corresponding to the hidden state i of the kth gain vector $\alpha_{s,n}^{k}$ corresponding to the visible state, s at point n in time. The generation section 140 also generates action association information including associations between actions and the gain vectors in the process of generating the selecting function $Kmax_n(s, b)$.

$$Kmax_n(s, b) = \mathrm{argmax}_k \left[ \sum_{i \text{ in } B} b(i) \alpha_{s,n}^k(i) \right] \text{ for } n < N$$

Subsequently, in S150, the generation section 140 subtracts 1 from n and advances the process to S160.

In S160, the generation section 140 determines whether or not n=0. If n=0, the generation section 140 ends the process. If n is not zero, the generation section 140 returns the process to S140. The generation section 140 thereby generates recursively the set $\Lambda_n(s)$ of gain vectors and/or the selecting function $Kmax_n(s, b)$ while n changes from N to zero.

Thus, the generating apparatus 10 first calculates from the learning data the state transition probability $P^a_{s,i;t,z}$ and the expected gain $q^a_s(i)$ and recursively calculates $\Lambda_n(s)$ from the set $\Lambda_{n+1}(s)$ of gain vectors on the basis of the calculated probability and gain. Since the generating apparatus 10 generates the set $\Lambda_n(s)$ of gain vectors in the model in which no transition from the hidden state b is made, the speed of processing can be increased.

The hidden state from which no transition is made can be considered as a characteristic not easily changeable in an environment. For example, the generating apparatus 10 can generate a set of gain vectors for selecting an optimum policy after incorporating a consumer's preference not easily observable in ordinary cases and not changed during a long time period (e.g., a preference for a meal or a hobby) in the model.

The generating apparatus 10 can be used in a robot having a plurality of sensors and capable of operating autonomously. For example, the generating apparatus 10 can adopt as a state from which no transition is made a state where part of a plurality of sensors are malfunctioning. For example, the generating apparatus 10 may set in a hidden state a matter to be detected with a malfunctioning sensor, thereby enabling the provision of a set of gain vectors for selecting an optimum policy upon considering the malfunctioning sensor.

The generating apparatus 10 can also be applied to a conversational speech generation device used in a speech recognition apparatus. For example, the generating apparatus 10 can treat as a hidden state the contents of a conversational speech not clearly caught. The generating apparatus 10 can thereby provide a set of gain vectors for selecting an optimum policy (e.g., a reply to a person in conversation) even in a situation where human conversational speech is not clearly caught.

FIG. 5 illustrates an example of a concrete algorithm for the processing flow in FIG. 3. An algorithm for processing in S140 will be described with reference to FIG. 5 by way of example.

First, as shown in the first line, the generation section 140 obtains a set $\Lambda_{n+1,t}$ of gain vectors in the state t (t∈S) at point n+1 in time. In some case, a set $\Lambda_{x(y)}$ is expressed as $\Lambda_{x,y}$ or $\Lambda_{(y,x)}$.

Subsequently, as shown in the second line, the generation section 140 initializes a set $\Lambda^*_{s,n}$ of gain vectors corresponding to all actions at point n in time by setting this set as an empty set.

Subsequently, as shown in the third line, the generation section 140 executes for each action a (a∈A, A: a set of actions) a first loop processing defined in the third to fourteenth lines.

As shown in the fourth line, the generation section 140 initializes the set $\Lambda^a_{s,n}$ of gain vectors associated with the action a in the first loop processing by setting this set as an empty set.

Subsequently, as shown in the fifth line, the generation section 140 executes a second loop processing defined in the fifth to twelfth lines for each combination of the visible state t (t∈S) and observation z (z∈Z, Z: a set of observations) in the first loop processing.

As shown in the sixth line, the generation section 140 initializes a vector set Φ in the second loop processing by setting this set as an empty set.

Subsequently, as shown in the seventh line, the generation section 140 executes a third loop processing defined in the seventh to ninth lines on each gain vector α (α∈Λ*$_{s,n+1}$) in the second loop processing.

As shown in the eighth line, the generation section 140 updates the vector set Φ in the third loop processing. More specifically, the generation section 140 forms the union of the existing vector set Φ and a new vector generated on the basis of the gain vector α at point n+1 in time.

The generation section 140 generates a new vector at time n having as a component corresponding to the hidden state i the sum of the quotient of the expected gain $q^a_s(i)$ divided by the number |S| of visible states s and the number |Z| of observations z and the product of the rate γ of reduction (0<γ<1) with respect to the future gain, the state transition probability $P^a_{s,i;t,z}$ and the component α(i) in the hidden state i of the gain vector α (i.e., the component of the cumulative expected gain corresponding to the hidden state i).

The generation section 140 may generate a new vector by setting γ=1 so that the future gain is not reduced.

Subsequently, as shown in the tenth line, the generation section 140 may prune the updated vector set Φ by a prune function after the third loop processing in the second loop processing. Of the vectors in the input vector set, those other than the vectors that achieve the maximum values of the inner product with some probability distributions b over hidden states are removed by the prune function.

Subsequently, as shown in the eleventh line, the generation section 140 generates the set $\Lambda^a_{s,n}$ of gain vectors at point n in time in the second loop processing. More specifically, the generation section 140 generates a sum vector by adding the vector α and vector α' with respect to all combinations of vectors α contained in the present set $\Lambda^a_{s,n}$ of gain vectors and vectors α' contained in the vector set Φ, and prunes the sum vector by the prune function, thereby generating the set $\Lambda^a_{s,n}$ of new gain vectors. The generation section 140 generates the set $\Lambda^a_{s,n}$ of gain vectors corresponding to the action a in this way and can therefore generate action association information as information on the association between the action and the gain vector.

Subsequently, as shown in the thirteenth line, the generation section 140 updates the set $\Lambda^*_{s,n}$ of gain vectors after the second loop processing in the first loop processing. More specifically, the generation section 140 updates the set $\Lambda^*_{s,n}$ by taking the union of the set $\Lambda^*_{s,n}$ and the set $\Lambda^a_{s,n}$.

Subsequently, as shown in the fifteenth line, the generation section 140 updates the set $\Lambda^*_{s,n}$ after the first loop processing. More specifically, the generation section 140 updates the set $\Lambda^*_{s,n}$ by inputting the set $\Lambda^*_{s,n}$ to the prune function.

Subsequently, as shown in the sixteenth line, the generation section 140 outputs the set $\Lambda^*_{s,n}$ as a set of gain vectors in the state, s at pint n in time.

Thus, the generating apparatus 10 generates the gain vector $\Lambda_{s,n}$ corresponding to the visible state, s at point n in time on the basis of the expected gain $q^a_s(i)$ in the visible state, s at point n+1 in time with respect to each hidden state i, $\Lambda_{s,n+1}$ in the visible state, s at point n+1 in time and the discount rate $\gamma$.

The generating apparatus 10 also generates the set $\Lambda_{s,n}$ by removing, from the set of gain vectors $\alpha_{s,n}$ contained in the set $\Lambda_{s,n}$ at each point n in time and each visible state, s, by the prune function, the gain vectors other than those achieving the maximum values of the inner product with some probability distributions b over hidden states.

FIG. 6 illustrates the relationship between the set $\Lambda_{s,n}$ of gain vectors and the cumulative expected gain. FIG. 6($a$) illustrates the relationship between the set $\Lambda_{s,n}$ and the cumulative expected gain. The set $\Lambda_{s,n}$ of gain vectors are assumed to include gain vectors $\alpha_1$, $\alpha_2$, $\alpha_3$, and $\alpha_4$. Each gain vector can be used for calculation of the value of the cumulative expected gain according to the probability distribution b over the hidden states. For ease of description with reference to FIG. 6, it is assumed that each gain vector returns the value of the cumulative expected gain not according to the probability distribution b but according only to the value of the probability b(i) of being in one hidden state i.

For example, if the probability b(i) of being in the hidden state i is $b_1$, the gain vector $\alpha_1$ returns a cumulative expected gain $\gamma_1$ according to the value of $b_1$; the gain vector $\alpha_2$, a cumulative expected gain $\gamma_2$ according to the value of $b_1$; the gain vector $\alpha_3$, a cumulative expected gain $\gamma_3$ according to the value of $b_1$; and the gain vector $\alpha_1$, a cumulative expected gain $\gamma_4$ according to the value of $b_1$.

As illustrated, the cumulative expected gain $\gamma_1$ is the maximum among the cumulative expected gains $\gamma_1$ to $\gamma_4$. Therefore the gain vector $\alpha_1$ corresponding to the cumulative expected gain $\gamma_1$ can be selected from the set of gain vectors $\alpha_1$ to $\alpha_4$ according to the probability $b_1$. For example, the selecting function outputs a number 1 corresponding to the gain vector $\alpha_1$ in response to input of the probability $b_1$. Similarly, the selecting function outputs the gain vector $\alpha_2$ taking the maximum of the cumulative expected gain in response to input of the probability $b_2$, and outputs the gain vector $\alpha_3$ taking the maximum of the cumulative expected gain in response to input of the probability $b_3$.

Since an action is associated with each gain vector, the optimum action can be selected by inputting the probability distribution b over the hidden states to the selecting function. For example, when the selecting function outputs the number 1 corresponding to the gain vector $\alpha_1$, the action corresponding to the number 1 can be selected as the optimum action.

FIG. 6($b$) illustrates a gain function which is obtained by connecting portions of the gain vectors having the maximums, and which returns the maximum of the cumulative expected gain. As illustrated, when only the segments with the maximums of the cumulative expected gain in the lines for the plurality of gain vectors $\alpha_1$ to $\alpha_4$ are connected, a gain function $v_n(s, b)$ in the form of a piecewise linear downward-convex function indicated by a thick line is obtained. The gain function $v_n(s, b)$ is a function expressed by $v_n(s, b)=\max[\Sigma_i\ b(i)\alpha(i)]$ and dependent on the visible state, s and the probability distribution b over the hidden states.

When generating the set $\Lambda_{s,n}$ the generation section 140 removes, by the prune function, the gain vectors (e.g., the gain vector $\alpha_4$) having no segment in which the cumulative expected gain is maximized. The generation section 140 can thus improve the calculation efficiency by eliminating from the gain vectors to be used in the selecting function useless ones not contributing to selection from the actions.

FIG. 7 illustrates another example of a concrete algorithm for the processing flow in FIG. 3. An algorithm for processing in S140 will be described with reference to FIG. 7 and to the example in FIG. 5. By the algorithm in this example, calculation of the set $\Lambda_{n,t}$ is performed without considering observation z (z$\epsilon$Z) unlike that shown in FIG. 5.

First, as shown in the first line, the generation section 140 executes for each visible state, s (s$\epsilon$S) a first loop processing defined in the first to eleventh lines.

Subsequently, as shown in the second line, the generation section 140 initializes a set $\Lambda_{(s,n)}$ of gain vectors corresponding to all actions in the first loop processing by setting this set as an empty set.

Subsequently, as shown in the third line, the generation section 140 executes for each action a (a$\epsilon$A) a second loop processing defined in the third to tenth lines.

Subsequently, as shown in the fourth line, the generation section 140 initializes a set $\Lambda_{(s,n,a)}$ of gain vectors associated with an action a in the second loop processing by setting this set as an empty set.

Subsequently, as shown in the fifth line, the generation section 140 executes a third loop processing defined in the fifth to eighth lines on each visible state, s' (s'$\epsilon$S) in the second loop processing. The visible state, s' represents the visible state at point n+1 in time.

As shown in the sixth line, the generation section 140 generates a set $\Lambda_{(s,n,a,s')}$ of gain vectors in the third loop processing. More specifically, the generation section 140 generates a new vector with respect to each gain vector $\alpha$ contained in the set $\Lambda_{(s',n+1)}$ at point n+1 in time. A state transition probability $P^a_{s,i;s'}$ represents the probability of transition from the visible state, s to the visible state, s' when the action a is executed in the visible state, s and the hidden state i.

For example, the generation section 140 generates a new vector from the gain vector $\alpha$ by setting, with respect to each hidden state i, as a component of the new vector corresponding to the hidden state i, the sum of the quotient of the expected gain $q^a_{s,i}$ divided by the number |S| of the visible state, s and the product of the state transition probability $P^a_{s,i;s'}$ and the component $\alpha(i)$ in the hidden state i of the gain vector $\alpha$. The generation section 140 generates the set $\Lambda_{(s,n,a,s')}$ by inputting the generated new vector to a prune function.

Subsequently, as shown in the seventh line, the generation section 140 generates the set $\Lambda_{(s,n,a)}$ in the third loop processing. More specifically, the generation section 140 generates a sum vector by adding the vector $\alpha$ and vector $\alpha'$ with respect to all combinations of vectors $\alpha$ contained in the set $\Lambda_{(s,n,a)}$ and vectors $\alpha'$ contained in the set $\Lambda_{(s,n,a,s')}$, and inputs the sum vector to the prune function, thereby generating the new set $\Lambda_{(s,n,a)}$. The generation section 140 can thereby associate actions a and the gain vectors contained in the set $\Lambda_{(s,n,a)}$ with each other.

Subsequently, as shown in the ninth line, the generation section 140 updates the set $\Lambda_{(s,n)}$ after the third loop processing in the second loop processing. More specifically, the generation section 140 updates the set $\Lambda_{(s,n)}$ by adding the set $\Lambda_{(s,n)}$ and the set $\Lambda_{(s,n,a)}$ together.

Figure 8:
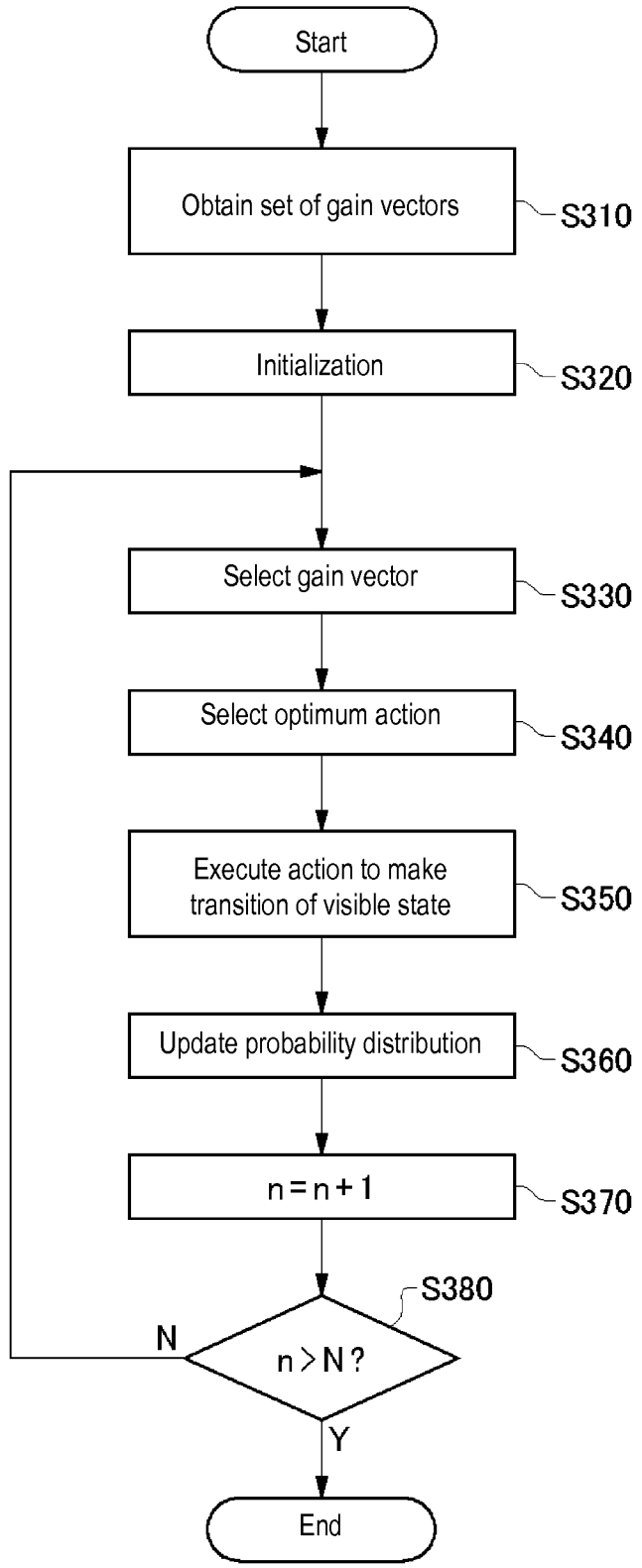
FIG. 8 illustrates a processing flow in a selecting apparatus according to the present embodiment.

FIG. 8 illustrates a processing flow in the selecting apparatus 20 according to the present embodiment. In the present embodiment, the selecting apparatus 20 selects an optimum action by executing processing from S310 to S380.

First, in S310, the acquisition section 210 obtains the set $\Lambda_{s,n}$ of gain vectors to be for calculation of cumulative expected gains at and after a reference point in time.

The acquisition section 210 may also obtain from the generating apparatus 10 action association information including the state transition probability $P^a_{s,i,s'}$ of transition from one visible state, s to another visible state, s' in the state set S when one action a is provided in the hidden state i, and associations between the action a and the gain vector $\alpha_{s,n}{}^a$.

The acquisition section 210 supplies the obtained set $\Lambda_{s,n}$ of gain vectors and action association information to the gain selection section 220. The acquisition section 210 also supplies the state transition probability $P^a_{s,i,s'}$ to the transition section 240.

Subsequently, in S320, the acquisition section 210 executes initialization of the environment to be simulated. For example, the acquisition section 210 sets initial conditions for visible states and hidden states.

For example, the acquisition section 210 may set as initial conditions $(s_0, b_0)$ for simulation, a visible state, $s_0$ at a future point in time and a probability distribution $b_0$ over hidden states in learning data obtained from the database 1000 by the generating apparatus 10. Also, for example, the acquisition section 210 may obtain directly from the database 1000 or the like initial conditions about visible states and hidden states in the environment.

Also, the acquisition section 210 initializes the point n in time by setting the point n in time to 1. The acquisition section 210 sets a future point N in time. For example, the acquisition section 210 sets a predetermined number as the point N in time. The acquisition section 210 supplies the results of initialization to the gain selection section 220.

Subsequently, in S330, the gain selection section 220 selects from the gain vectors α according to the present visible state, s the gain vector α which maximizes the cumulative expected gain with respect to the probability distribution b over the hidden states at the present point in time.

For example, the gain selection section 220 generates the selecting function $Kmax_n(s, b)$ expressed by expression (1) from the set $\Lambda_{s,n}$ of gain vectors and prescribed on the basis of the probability b(i) of the hidden state being i and $\alpha_{s,n}{}^k(i)$ corresponding to the hidden state i of the kth gain vector $\alpha_{s,n}{}^k$ corresponding to the visible state, s at point n in time.

$$Kmax_n(s, b) = \mathrm{argmax}_k \left[ \sum_{i \text{ in } B} b(i)\alpha_{s,n}^k(i) \right] \text{ for } n < N$$

Subsequently, the gain selection section 220 inputs the present visible state, s and the probability distribution b over the hidden states to the selecting function $Kmax_n(s, b)$ to select the gain vector $\alpha^k_{s,n}$ determined in correspondence with the probability distribution b over the hidden states. The gain selection section 220 may select the gain vector $\alpha^k_{s,n}$ by the selecting function $Kmax_n(s, b)$ obtained through the acquisition section 210 in place of the set $\Lambda_{s,n}$ of gain vectors. The gain selection section 220 supplies the selected gain vector $\alpha^k_{s,n}$ and action association information to the action selection section 230.

Subsequently, in S340, the action selection section 230 selects as an optimum action the action corresponding to the gain vector selected by the gain selection section 220. For example, the action selection section 230 selects, on the basis of the action association information, an action k associated with the gain vector $\alpha^k_{s,n}$ in advance as an optimum action k which gives the maximum cumulative expected gain when the action is executed at point n in time. The action selection section 230 supplies the selected action k to the transition section 240.

Subsequently, in S350, the transition section 240 causes a probabilistic transition from the visible state, s in response to the execution of the action k selected by the action selection section 230 on the basis of the state transition probability corresponding to the selected action and the present probability distribution b over the hidden states.

That is, the transition section 240 causes a transition from the present visible state, s to one visible state t (t∈S) with a state transition probability $P^k_{s,i;t,z}$.

Subsequently, the transition section 240 updates the probability distribution b over the hidden states on the basis of a state transition probability $P^k_{s,i,s',z}$ corresponding to the selected action k and the present probability distribution b over the hidden states. For example, the transition section 240 updates the probability distribution b over hidden states by substituting the result of computation by expression (2) in the probability b(i) of the hidden state being i.

$$b(i) = \frac{b(i)p^a_{s,i;s',z}}{\sum_{j \in B} b(j)p^a_{s,j;s',z}}$$

$P^a_{s,i;s',z}$ represents a state transition probability of transition from the visible state, s to the visible state, s' and observation of observation z given that the action a is taken in the hidden state i and the visible state, s.

In the case of a transition model without consideration of observation z, the transition section 240 updates the probability distribution b over the hidden states on the basis of a state transition probability $P^k_{s,i,s'}$ corresponding to the selected action k and the present probability distribution b over the hidden states. For example, the transition section 240 updates the probability distribution b over the hidden states by substituting the result of computation by expression (3) in the probability b(i) of the hidden state being i.

$$b(i) = \frac{b(i)p^a_{s,i;s'}}{\sum_{j \in B} b(j)p^a_{s,j;s'}}$$

$P^a_{s,i;s'}$ represents a state transition probability of transition from the visible state, s to the visible state, s' given that the action a is taken in the hidden state i and the visible state, s.

Subsequently, in S370, the transition section 240 adds 1 to n. The transition section 240 then advances the process to S380.

Subsequently, in S380, the transition section 240 determines whether n exceeds N. If n>N, the transition section 240 ends the process. If n is not larger than N, the transition section 240 returns the process to S330.

Thus, the selecting apparatus 20 can select and output an optimum policy according to the visible state, s and the probability distribution b over the hidden states by using the set $\Lambda_{s,n}$ of gain vectors generated by the generating apparatus 10.

Figure 9:
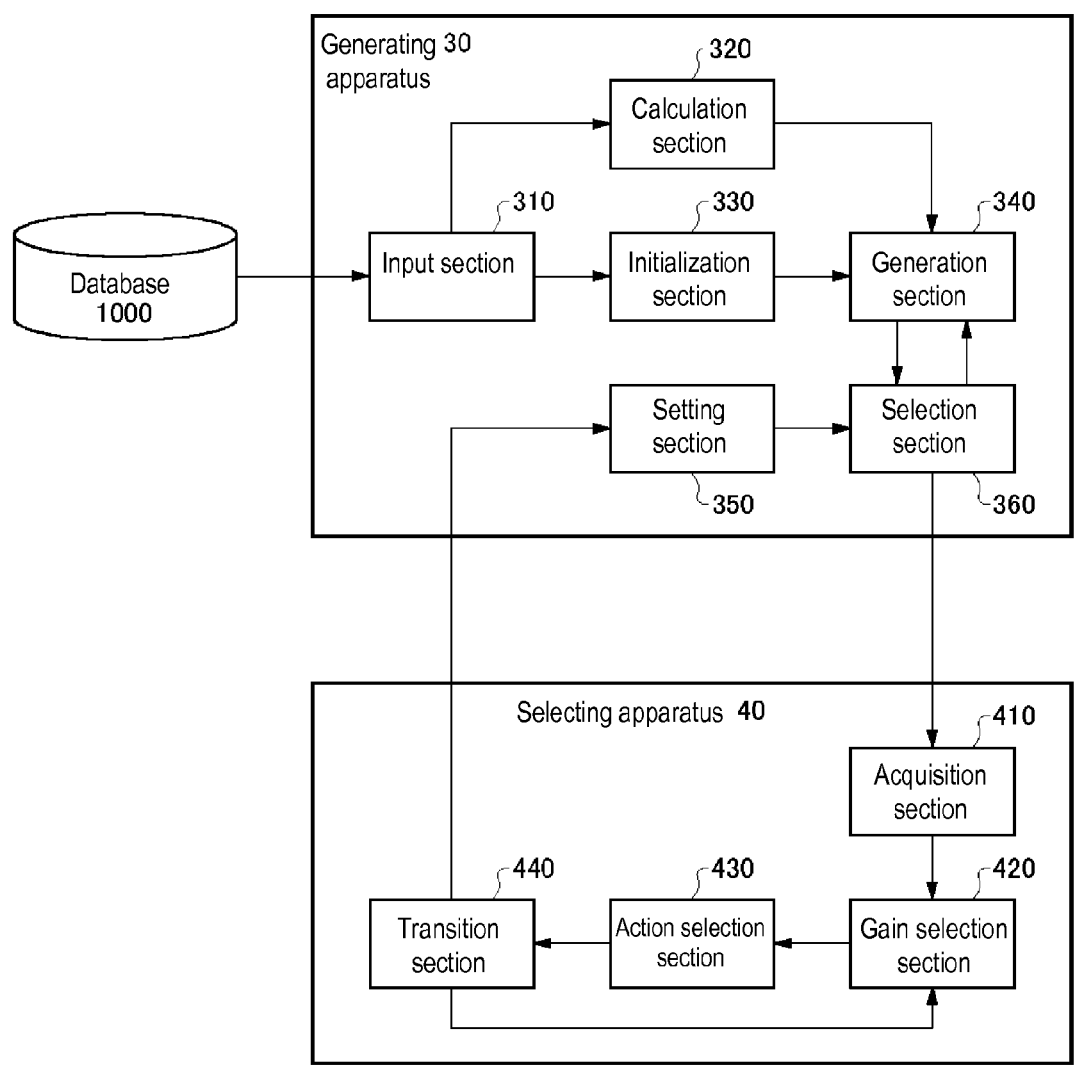

FIG. 9 illustrates an outline of the information processing system according to a modified example of the present embodiment. In this modified example, a generating apparatus 30 generates a set of gain vectors, then selects a subset of the generated gain vectors, and supplies the selected gain vectors to a selecting apparatus 40.

The generating apparatus 30 generates for each of visible states a set of gain vectors used for calculation of cumulative expected gains at and after a reference point in time with respect to a transition model having observable visible states and unobservable hidden states and expressing a transition from a present visible state to a subsequent visible state according to an action and/or a hidden state. The generating apparatus 30 has an input section 310, a calculation section 320, an initialization section 330, a generation section 340, a setting section 350, and a selection section 360. The input section 310, the calculation section 320 and the initialization section 330 may be similar in configuration to the input section 110, the calculation section 120 and the initialization section 130 according to the generating apparatus 10 described with reference to FIG. 1.

The generation section 340 recursively generates, by retroacting from a future point in time, on the basis of a state transition probability and an expected gain, a set of gain vectors which has at least one gain vector to be used for calculation of a cumulative expected gain at and after a reference point in time and from which the gain vector which gives the maximum of the cumulative expected gain is to be selected, as does the generation section 140.

The generation section 340 also generates action association information including associations between actions and gain vectors at the time of generation of a set of gain vectors. The generation section 340 may supply the generated set of gain vectors, the state transition probability and action association information to the selection section 360.

The setting section 350 sets a probability distribution over hidden states for selection which is used to select vectors to be included in the set of gain vectors. The setting section 350 supplies the set probability distribution for selection to the selection section 360.

The selection section 360 selects, on the basis of the set probability distribution for selection, at least part of the gain vectors from the set of gain vectors generated by the generation section 340. For example, the selection section 360 generates a new set of gain vectors by selecting with priority the gain vector which gives the maximum of the cumulative expected gain with respect to the probability distribution for selection, and by including the selected gain vector in the set of gain vectors.

The selection section 360 may supply a generated new set of gain vectors at a certain point n+1 in time to the generation section 340 and cause the generation section 340 to generate a set of gain vectors at the preceding point n in time. The selection section 360 supplies the set of gain vectors eventually selected, the state transition probability and the action association information to the selecting apparatus 40.

The selecting apparatus 40 selects an optimum action on the basis of a set of gain vectors in a transition model having observable visible states and unobservable hidden states and expressing a transition from a present visible state to a subsequent visible state according to an action.

The selecting apparatus 40 has an acquisition section 410, a gain selection section 420, an action selection section 430, and a transition section 440. The acquisition section 410, the gain selection section 420 and the action selection section 430 may be similar in configuration to the acquisition section 210, the gain selection section 220 and the action selection section 230 according to the selecting apparatus 20 described with reference to FIG. 1.

The transition section 440 causes a transition of a visible state and a probability distribution over hidden states according to an action selected by the action selection section 430, as does the transition section 240 according to the selecting apparatus 20. The transition section 440 supplies the updated visible state and probability distribution over the hidden states to the gain selection section 420 and causes the gain selection section 420 to again select from the gain vectors on the basis of the visible state and the probability distribution over the hidden states. The transition section 440 may also supply the setting section 350 of the generating apparatus 30 with a time series of the probability distribution over the hidden states updated at intervals.

Thus, in the information processing system in this modified example, the generating apparatus 30 generates a set of gain vectors by selecting gain vectors on the basis of a probability distribution for selection, and supplies the set of gain vectors to the selecting apparatus 40. As a result, the selecting apparatus 40 uses a reduced number of gain vectors and can calculate an optimum action with improved efficiency.

Figure 10:
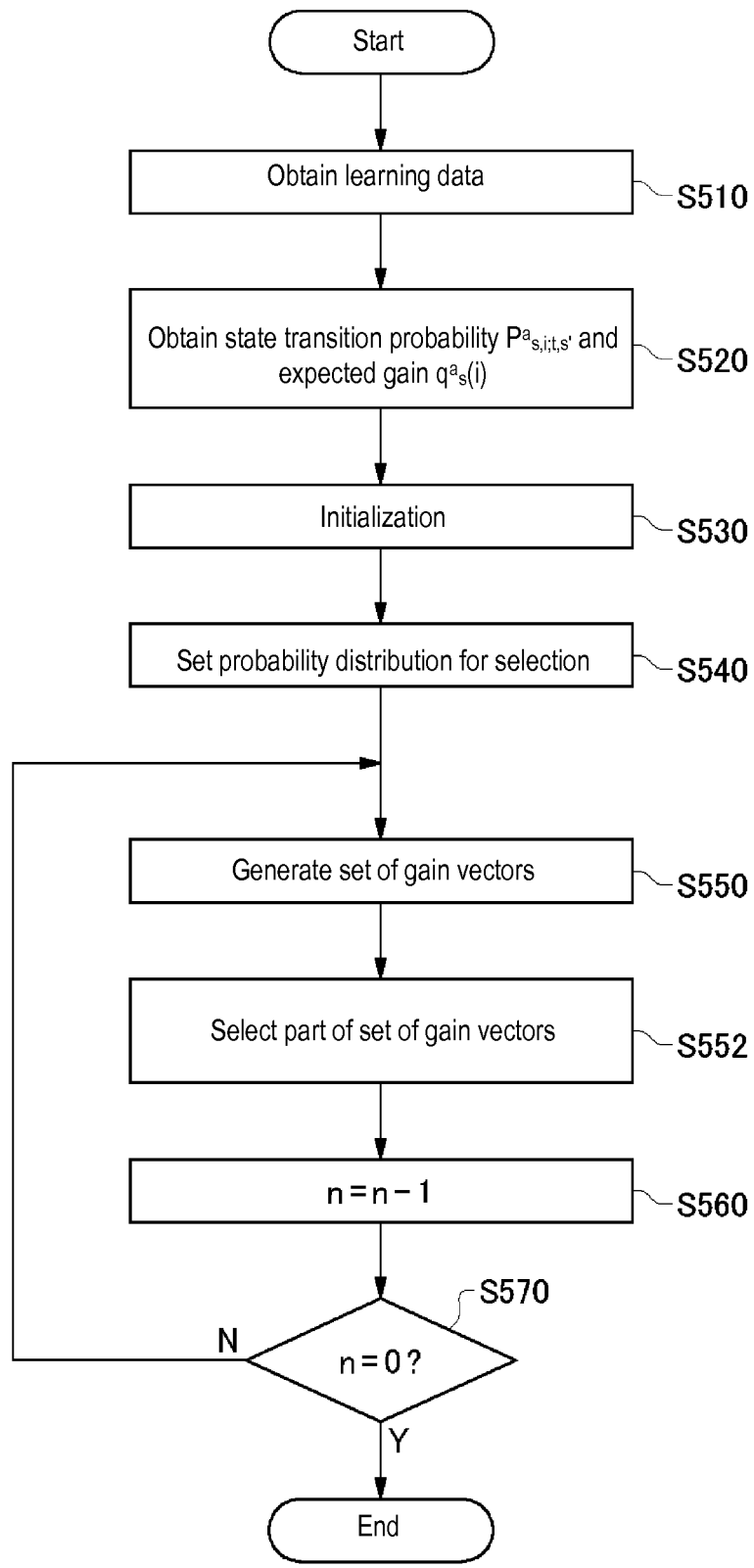
FIG. 10 illustrates an example of a processing flow in a generating apparatus 30 according to the modified example.

FIG. 10 illustrates an example of a processing flow in the generating apparatus 30 in this modified example. In this modified example, the generating apparatus 30 generates a set of gain vectors by executing processing from S510 to S570. The generating apparatus 30 may execute processing from S510 to S530 in the same way as the corresponding generating apparatus executes processing from S110 to S130 shown in FIG. 3.

In S540, the setting section 350 sets a probability distribution over hidden states for selection which is used to select vectors to be included in the set of gain vectors to be supplied to the selecting apparatus 40. For example, the setting section 350 sets a predetermined set of vectors as a probability distribution over hidden states for selection.

For example, the setting section 350 may set as a probability distribution for selection a set of vectors $\{e_i | i=1, \ldots, |B|\}$ whose length is the number $|B|$ of hidden states, and in which a component corresponding to each hidden state i is a predetermined value (e.g., 1). The setting section 350 may supply the set probability distribution for selection to the selection section 360.

Subsequently, in S550, the generation section 340 recursively generates a set $\Lambda_n(s)$ of gain vectors $\alpha_{s,n}$ with respect to point n in time satisfying $1 \leq n \leq N$ from a set $\Lambda_{n+1}(s)$ with respect to point n+1 in time, as does the corresponding section in S140. The generation section 340 supplies the set $\Lambda_n(s)$ of gain vectors with respect to point n in time or the like to the selection section 360.

Subsequently, in S552, the selection section 360 generates a set of gain vectors by selecting at least part of the set of gain vectors on the basis of the probability distribution for selection. For example, the selection section 360 selects with priority the gain vector which gives the maximum of the cumulative expected gain with respect to the probability distribution for selection from the set of gain vectors with respect to the point n in time received from the generation section 340, and includes the selected the gain vector in the set of gain vectors, thereby generating a set of gain vectors selected with respect to the point n in time.

That is, the selection section 360 removes, from the set of gain vectors, the gain vectors other than those giving maximums of the cumulative expected gain with respect to the probability distribution for selection. The selection section 360 supplies the generation section 340 with the generated set of gain vectors selected with respect to the point n in time. Concrete details of processing for selection of gain vectors performed by the selection section 360 will be described later.

Subsequently, in S560, the selection section 360 reduces the value of n by 1 and advances the process to S570.

Subsequently, in S570, the selection section 360 determines whether n=0. If n=0, the selection section 360 ends the process. If n is not zero, the selection section 360 returns the process to S550. In processing in S550 performed for the second time or later, the generation section 340 again generates a set of vectors on the basis of the selected set of gain vectors generated by the selection section 360, and supplies the generated set of gain vectors to the selection section 360. In this way, the generation section 340 and the selection section 360 recursively generate the set $\Lambda_n(s)$ of gain vectors until n changing from N becomes equal to 0.

Thus, in the generating apparatus 30 in this modified example, the generation section 340 generates a set of gain vectors and the selection section 360 selects only part of the gain vectors generated by the generation section 340. The generating apparatus 30 reduces the number of gain vectors contained in the set of gain vectors finally generated. An increase in speed of selection processing performed by the selecting apparatus 40 can thus be achieved.

FIG. 11 illustrates an example of a concrete algorithm for processing flow in FIG. 10. An algorithm for processing in S550 and S552 in FIG. 10 will be described below.

First, as shown in the first line, the generation section 340 obtains a set $\Lambda_{t,n+1}$ of gain vectors in a state t (t∈S) at a point n+1 in time, and the selection section 360 obtains a set B of probability distributions b over hidden states for selection.

Subsequently, the generation section 340 executes a first loop processing defined in the second to fourth lines with respect to each action a (a∈A), each visible state t (t∈S) and each observation z (z∈Z).

As shown in the third line, the generation section 340 updates a vector set $\Theta^a_{t,z}$ in the first loop processing. More specifically, the generation section 340 generates a gain vector $\alpha_{t,z}$ ($\alpha_{t,z} \in \Theta^a_{t,z}$) at the point n in time by multiplying together a state transition probability $P^a_{s,i;t}$ and a component $\alpha(i)$ of the hidden state i of the gain vector $\alpha$ at the point n+1 in time (i.e., a component of the cumulative expected gain corresponding to the hidden state i) with respect to each component i of the hidden state.

Subsequently, the selection section 360 executes a second loop processing shown in the fifth to seventh lines with respect to each probability distribution b for selection (b∈B).

As shown in the sixth line, the selection section 360 generates a vector set $\psi_b$ by selecting gain vectors from a set $\Theta^a_{t,z}$ of gain vectors. More specifically, the selection section 360 selects, by an argmax function, with respect to each of the probability distributions b for selection, the gain vector $\alpha_{t,z}$ by which the product of the hidden state probability distribution b and the gain vector $\alpha_{t,z}$ is maximized, and adds to the vector set $\psi_b$ the sum of the selected gain vector $\alpha_{t,z}$ and an expected gain $q^a_s$. The selection section 360 may further multiply the product of the hidden state probability distribution b and the gain vector $\alpha_{t,z}$ by a discount rate $\gamma$ (0<$\gamma$<1).

Subsequently, as shown in the eighth line, the selection section 360 generates a set $\Lambda_{s,n}$ of gain vectors selected with respect to the point n in time by selecting gain vectors from the vector set $\psi$b. More specifically, the selection section 360 selects, by the argmax function, the gain vector $\alpha$ by which the product of the hidden state probability distribution b and the gain vector $\alpha$ ($\alpha \in \psi$) is maximized, thereby forming the selected set $\Lambda_{s,n}$ of gain vectors.

Subsequently, in the ninth line, the selection section 360 outputs the set $\Lambda_{s,n}$ as a set of vectors in the state, s at the point n in time.

FIG. 12 illustrates the relationship between the set $\Lambda_{s,n}$ and the cumulative expected gain in this modified example. FIG. 12(a) illustrates the relationship between the set $\Lambda_{s,n}$ and the cumulative expected gain, as does FIG. 6(a). The generation section 340 generates the set $\Lambda_{s,n}$ of gain vectors including gain vectors $\alpha_1$, $\alpha_2$, $\alpha_3$, and $\alpha_4$.

In this modified example, the setting section 350 sets probability distributions $b_1'$ and $b_2'$ for selection. For ease of description with reference to FIG. 12, each of the probability distributions $b_1'$ and $b_2'$ for selection is assumed to be not a vector but a value b(i) corresponding to one hidden state i.

For example, with respect to the probability distribution $b_1'$ for selection, the selection section 360 includes in the selected set of gain vectors the gain vector $\alpha_1$ which gives the maximum of the cumulative expected gain in the gain vectors $\alpha_1$ to $\alpha_4$. Also, with respect to the probability distribution $b_2'$ for selection, the selection section 360 includes in the selected set of gain vectors the gain vector $\alpha_3$ which gives the maximum of the cumulative expected gain in the gain vectors $\alpha_1$ to $\alpha_4$. Thus, the selection section 360 generates, on the basis of the probability distributions $b_1'$ and $b_2'$ for selection a selected set of gain vectors including the gain vectors $\alpha_1$ and $\alpha_3$ from the gain vectors $\alpha_1$ to $\alpha_4$ generated by the generation section 340.

FIG. 12(b) illustrates a gain function which is obtained by connecting portions of the gain vectors contained in the set of gain vectors generated by the generating apparatus 30 in this modified example, and which returns the maximum of the cumulative expected gain.

As illustrated, when only the segments with the maximums of the cumulative expected gain in the lines for the gain vectors $\alpha_1$ and $\alpha_3$ contained in the selected set of gain vectors are connected, a gain function $v_n(s, b)$ in the form of a piecewise linear downward-convex function indicated by a thick line is obtained. If $\alpha$ is a gain vector contained in a selected set of gain vector, the gain function $v_n(s, b)$ is a function expressed by $v_n(s, b) = \max[\Sigma_i b(i)\alpha(i)]$ and dependent on the visible state, s and the probability distribution b over the hidden states.

Thus, in this modified example, the number of gain vectors can be reduced in comparison with the gain function shown in FIG. 6(b). Calculation by the selecting function in the selecting apparatus 40 can thereby be improved in speed and efficiency.

Figure 13:
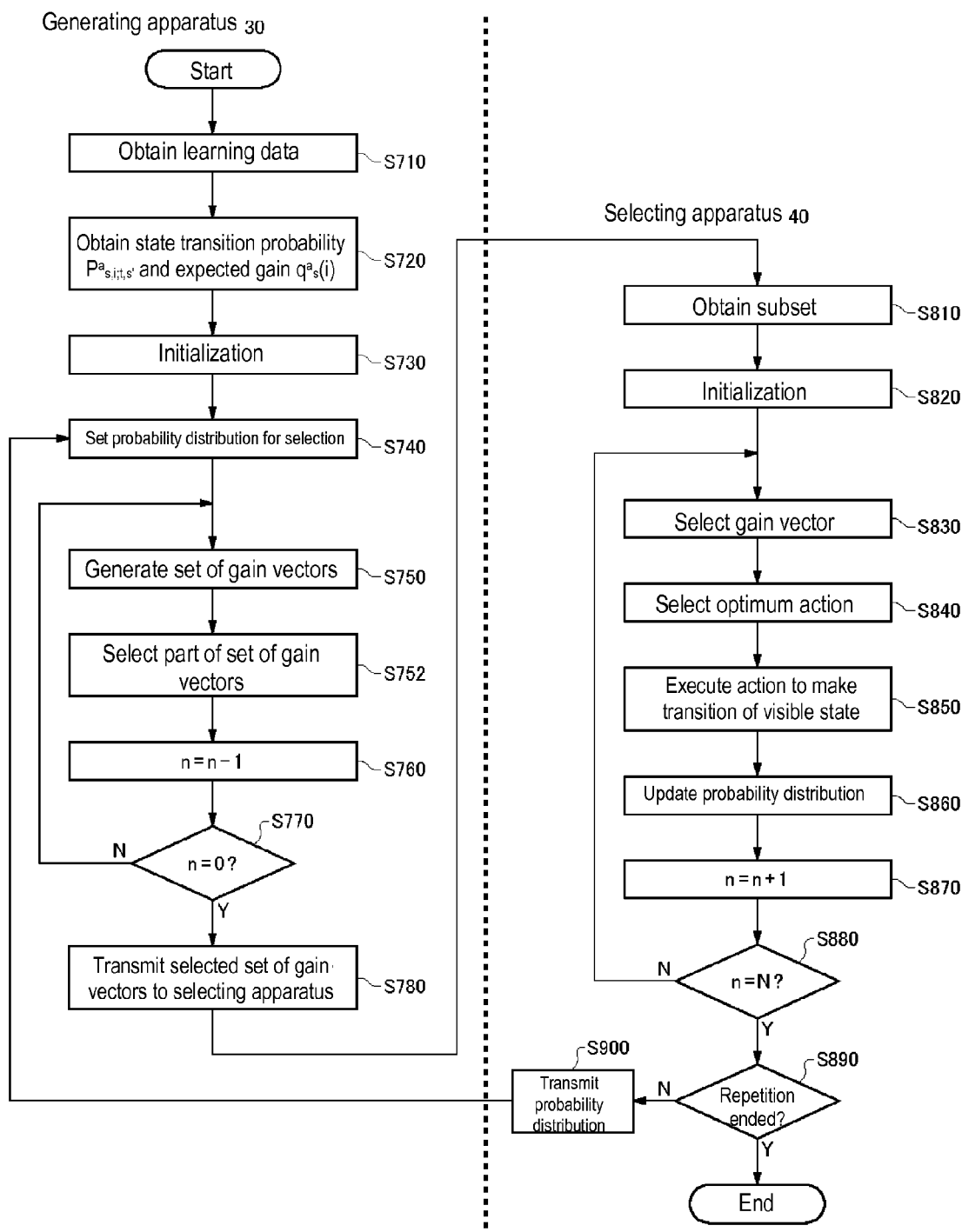
FIG. 13 illustrates another example of a processing flow in the modified example.

FIG. 13 illustrates another example of a processing flow in this modified example of the present embodiment. In this modified example, the selecting apparatus 40 selects actions by the selecting function with respect to predetermined time periods 1 to N and executes update of a probability distribution, and the generating apparatus 30 receives the updated probability distribution from the selecting apparatus 40 and updates the set of gain vectors by using the received probability distribution as a probability distribution for selection.

The generating apparatus 30 may execute processing from S710 to S760 in the same way as it executes processing from S510 to S570 shown in FIG. 10. In S770, the generation section 340 determines whether n=0. If n=0, the generation section 340 advances the process to S780. If n is not zero, the generation section 340 returns the process to S750.

In S780, the selection section 360 in the generating apparatus 30 supplies the selected set of gain vectors generated, action association information including associations between actions and the gain vectors and the rates of transition of visible states to the selecting apparatus 40.

The selecting apparatus 40 may execute processing from S810 to S870 in the same way as the corresponding apparatus does processing from S310 to S370 in FIG. 8.

In S880, the transition section 240 determines whether n exceeds N. In n>N, the transition section 240 advances the process to S890. If n is not larger than N, the transition section 240 returns the process to S830.

In S890, the transition section 240 determines whether update of the probability distribution by the selecting apparatus 40 selecting an action by means of the selecting function and update of the set of gain vectors by the generating apparatus 30 receiving the updated probability distribution from the selecting apparatus and using the received probability distribution as a probability distribution for selection have been executed a predetermined number of times.

If the predetermined number of executions has been completed, the transition section 240 ends the process. If the predetermined number of executions has not been completed, the transition section 240 returns the process to S900.

In S900, the transition section 440 transmits to the generating apparatus 30 information on the probability distribution over the hidden states at each of points in time during the generation in processing in S860 repeatedly executed.

Subsequently, the setting section 350 in the generating apparatus 30 again executes the process in S740, receives the probability distribution over the hidden states at each of the points in time updated by the transition section 440, and sets the received probability distribution as a probability distribution for selection. The setting section 350 may set, as a probability distribution for selection, the probability distribution updated by the transition section 440 in addition to or in place of the probability distribution for selection already set.

As described above, when the action corresponding to the gain vector which returns the maximum of the cumulative expected gain is selected by the gain selection section 420 from the set of gain vectors generated by the generation section 340, the setting section 350 can set, as a probability distribution for selection, according to the selected action, the probability distribution over the hidden states updated by the transition section 440.

Thus, in the information processing system in this modified example, each time the generation of gain vectors by the generating apparatus 30, selection of an optimum action by the selecting apparatus 40 are repeatedly executed, the gain vectors to be included in the set of gain vectors can be selected on the basis of the probability distribution over the hidden states set closer to the actuality. The selecting apparatus 40 can therefore execute selection of an optimum action at a higher speed with improved accuracy.

Figure 14:
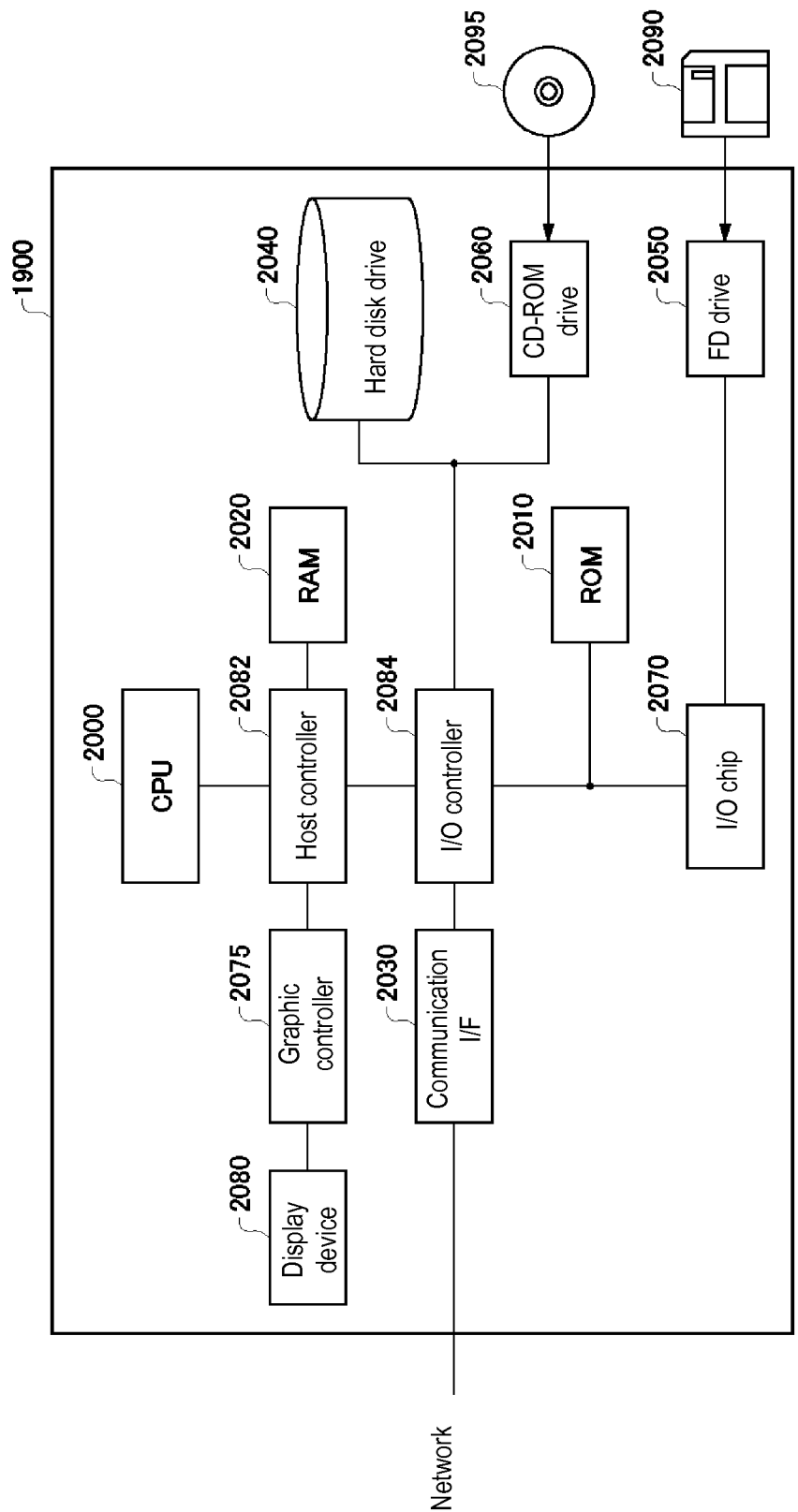
FIG. 14 illustrates an example of a hardware configuration of a computer.

FIG. 14 illustrates an example of a hardware configuration of a computer 1900 functioning as the generating apparatus 10, the selecting apparatus 20, the generating apparatus 30 and/or the selecting apparatus 40. The computer 1900 according to the present embodiment is provided with CPU peripheral sections: a CPU 2000, a RAM 2020, a graphic controller 2075 and a display device 208, connected to each other by a host controller 2082, input/output sections: a communication interface 2030, a hard disk drive 2040 and a CD-ROM drive 2060, connected to the host controller 2082 by an input/output controller 2084, and legacy input/output sections: a ROM 2010, a flexible disk drive 2050 and an input/output chip 2070, connected to the input/output controller 2084.

The host controller 2082 connects the RAM 2020 and the CPU 2000 and the graphic controller 2075, which access the RAM 2020 at a high transfer rate. The CPU 2000 operates on the basis of a program stored in the ROM 2010 and the RAM 2020 to control each section. The graphic controller 2075 obtains image data generated on a frame buffer provided in the RAM 2020 by the CPU 2000 for example, and displays the image data on the display device 2080. The graphic controller 2075 may alternatively incorporate the frame buffer for storing image data generated by the CPU 2000 for example.

The input/output controller 2084 connects the host controller 2082, the communication interface 2030, which is an input/output device of a comparatively high speed, the hard disk drive 2040 and the CD-ROM drive 2060. The communication interface 2030 communicates with another device over a wired or wireless network. The communication interface also functions as a piece of hardware for performing communication. The hard disk drive 2040 stores programs and data used by the CPU 2000 in the computer 1900. The CD-ROM drive 2060 reads out a program or data from a CR-ROM 2095 and provides the program or data to the hard disk drive 2040 through the RAM 2020.

The ROM 2010 and the flexible disk drive 2050 and the input/output chip 2070, which are input/output devices of a comparatively low speed, are connected to the input/output controller 2084. A boot program executed by the computer 1900 at the time of startup and/or a program or the like dependent on the hardware of the computer 1900 are stored in the ROM 2010. The flexible disk drive 2050 reads out a program or data from a flexible disk 2090 and provides the program or data to the hard disk drive 2040 through the RAM 2020. The input/output chip 2070 connects the flexible disk drive 2050 to the input/output controller 2084 and also connects various input/output devices to the input/output controller 2084, for example, through a parallel port, a serial port, a keyboard port, a mouse port, and the like.

A program to be provided to the hard disk drive 2040 through the RAM 2020 is provided for a user by being stored on a recording medium such as the flexible disk 2090, the CR-ROM 2095 or an IC card. The program is read out from the recording medium, installed in the hard disk drive 2040 in the computer 1900 through the RAM 2020 and executed in the CPU 2000.

A program installed in the computer 1900 to cause the computer 1900 to function as the generating apparatus 10 and the selecting apparatus 20 includes an input module, a calculation module, an initialization module, a generation module, a setting module, a selection module, an acquisition module, a gain selection module, an action selection module and a transition module. The program or the modules may act on the CPU 2000 or the like to cause the computer 1900 to function as each of the input section 110, the calculation section 120, the initialization section 130, the generation section 140, the acquisition section 210, the gain selection section 220, the action selection section 230, the transition section 240, the input section 310, the calculation section 320, the initialization section 330, the generation section 340, the setting section 350, the selection section 360, the acquisition section 410, the gain selection section 420, the action selection section 430, and the transition section 440.

Information processing described on the program is read to the computer 1900 to cause concrete means in which pieces of software and the above-described various hardware resources cooperate with each other to function as the input section 110, the calculation section 120, the initialization section 130, the generation section 140, the acquisition section 210, the gain selection section 220, the action selection section 230, the transition section 240, the input section 310, the calculation section 320, the initialization section 330, the generation section 340, the setting section 350, the selection section 360, the acquisition section 410, the gain selection section 420, the action selection section 430, and the transition section 440. By these concrete means, calculation or processing of information according to purposes of use of the computer 1900 in the present embodiment is realized, thus constructing the specific generating apparatus 10, selecting apparatus 20, the generating apparatus 30 and selecting apparatus 40 according to the use purposes.

For example, when communication is performed between the computer 1900 and an external device or the like, the CPU 2000 executes a communication program loaded on the RAM 2020 to direct the communication interface 2030 to perform communication processing on the basis of details of processing described in the communication program. The communication interface 2030 under the control of the CPU 2000 reads out transmission data stored on a transmission buffer area or the like provided on a storage device, e.g., the RAM 2020, the hard disk drive 2040, the flexible disk 2090 or the CD-ROM 2095, and transmits the read data over a network or writes reception data received from the network to a reception buffer area or the like provided on the storage device. The communication interface 2030 may transfer transmission or reception data between itself and the storage device by DMA (direct memory access). The CPU 2000 may alternatively read out data from the storage device or the communication interface 2030 as a transfer source and transfer transmission or reception data by writing the data to the communication interface 2030 or the storage device as a transfer destination.

Also, the CPU 2000 reads the whole or a necessary portion of a file stored on an external storage device, e.g., the hard disk drive 2040, the CD-ROM drive 2060 (CD-ROM 2095) or the flexible disk drive 2050 (flexible disk 2090) or data in a database or the like to the RAM 2020 by DMA transfer or the like, and performs various kinds of processing on the data on the RAM 2020. The CPU 2000 writes the processed data back to the external storage device by DMA transfer or the like. The RAM 2020 can be considered to temporarily hold the contents of the external storage device in such a process. In the present embodiment, therefore, the RAM 2020, the external storage device and the like are generally referred to as a memory, a storage section or a storage device for example.

Various sorts of information such as various programs, data, tables and databases in the present embodiment are stored in such a storage device and can be subjected to information processing. The CPU 2000 can also hold part of the RAM 2020 on a cache memory and perform read/write on the cache memory. Also in such a form, the cache memory performs part of the functions of the RAM 2020. In the present embodiment, therefore, the cache memory is assumed to be included in the RAM 2020, the memory and/or the storage device except when discriminably categorized.

The CPU 2000 also performs on data read out from the RAM 2020 any of various kinds of processing including various calculations described in the description of the present embodiment, processing of information determination of conditions, and information search and replacement, designated by sequences of instructions in programs, and writes the processed data to the RAM 2020. For example, in the case of making a determination as to a condition, the CPU 2000 determines whether or not one of the various variables described in the description of the present embodiment satisfies a condition, for example, as to whether it is larger or smaller than, equal to or larger than, equal to or smaller than, or equal to another variable or a constant. If the condition is met (or not met), the process branches off to a different sequence of instructions or a subroutine is called up.

The CPU 2000 can also search information stored in a file in the store device, a database or the like. For example, in a case where a plurality of entries are stored in the storage device such that attribute values of a second attribute are respectively associated with attribute values of a first attribute, the CPU 2000 may search for the entry in which the attribute values of the first attribute coincide with a designated condition in the plurality of entries stored in the storage device, and read out the attribute values of the second attribute stored in the entry. The attribute values of the second attribute associated with the first attribute satisfying the predetermined condition can thereby be obtained.

The above-described programs or modules may be stored on an external storage medium. As this storage medium, an optical recording medium such as a DVD or a CD, a magneto-optical recording medium such as MO, a tape medium and a semiconductor memory such as an IC card can be used as well as the flexible disk 2090 and the CD-ROM 2095. A storage device such as a hard disk or a RAM provided in a server system connected to a special-purpose communication network or the Internet may be used as the recording medium to provide the programs to the computer 1900 through the network.

While the present invention has been described by using the embodiment, the technical scope of the present invention is not limited to that described in the above description of the embodiment. It is apparent for those skilled in the art that various changes and modifications can be made in the above-described embodiment. From the description in the appended claims, it is apparent that forms obtained by making such changes or modifications are also included in the technical scope of the present invention.

The order in which operations, procedures, steps, stages, etc., are executed in processing in the apparatuses, the system, the programs and the methods described in the appended claims, the specification and the drawings is not indicated particularly explicitly by "before", "prior to" or the like. Also, it is to be noted that such process steps can be realized in a sequence freely selected except where an output from a preceding stage is used in a subsequent case. Even if descriptions are made by using "first", "next", etc., for convenience sake with respect to operation flows in the appended claims, the specification and the drawings, they are not intended to show the necessity to execute in the order specified thereby.

REFERENCE SIGNS LIST

10 . . . Generating apparatus
110 . . . Input section
120 . . . Calculation section
130 . . . Initialization section
140 . . . Generation section 20 . . . Selecting apparatus
210 . . . Acquisition section
220 . . . Gain selection section
230 . . . Action selection section
240 . . . Transition section
30 . . . Generating apparatus
310 . . . Input section
320 . . . Calculation section
330 . . . Initialization section
340 . . . Generation section
350 . . . Setting section
360 . . . Selection section
40 . . . Selecting apparatus
410 . . . Acquisition section
420 . . . Gain selection section
430 . . . Action selection section
440 . . . Transition section
1000 . . . Database
1900 . . . Computer
2000 . . . CPU
2010 . . . ROM
2020 . . . RAM
2030 . . . Communication interface
2040 . . . Hard disk drive
2050 . . . Flexible disk drive
2060 . . . CD-ROM drive
2070 . . . Input/output chip
2075 . . . Graphic controller
2080 . . . Display device
2082 . . . Host controller
2084 . . . Input/output controller
2090 . . . Flexible disk
2095 . . . CD-ROM

The invention claimed is:

1. A computer implemented method for generating a set of gain vectors with respect to a transition model having observable visible states and unobservable hidden states and expressing a transition from a present visible state to a subsequent visible state according to an action, the set of gain vectors being generated for each visible state and used for calculation of a cumulative expected gain at and after a reference point in time, the method comprising:
   setting, with respect to each hidden state, a probability distribution over the hidden states for selection used to select vectors to be included in the set of gain vectors from gain vectors including a component for a cumulative gain; and
   Selection by including, in the set of gain vectors, with priority, a gain vector giving the maximum of the cumulative expected gain with respect to the probability distribution for selection; and
   selecting an optimum action based on the set of gain vectors by:
   setting initial conditions for visible and hidden states for an environment to be simulated;
   selecting the gain vector which maximizes the cumulative expected gain with respect to the probability distribution over the hidden states at the present point in time;
   selecting an action that corresponds to the selected gain vector;
   executing the selected action to cause a probabilistic transition from a visible state based on a state transition probability corresponding to the selected action and a present probability distribution over the hidden states; and
   updating the probability distribution over the hidden states on the basis of the state transition probability corresponding to the selected action and the present probability distribution over the hidden states.

2. The method of claim 1, further comprising recursively generating the set of gain vectors by retroacting from a future point in time to the reference point in time.

3. The method of claim 2, further comprising setting in the probability distribution for selection a vector having a length corresponding to the number of hidden states and having, with respect to each hidden state, 1 as a component corresponding to the hidden state.

4. The method of claim 2, further comprising setting a probability distribution over the hidden states updated according to a selected action corresponding to the gain vector returning the maximum of the cumulative expected gain from the set of gain vectors generated in the generation.

5. The method of claim 2, further comprising initializing the set of gain vectors at a future point N in time, wherein N is an integer equal to or larger than 2.

6. The method of claim 2, recursively generating a set $\Lambda_n(s)$ of gain vectors $\alpha_{s,n}$ with respect to a visible state, s (s∈S, where S is a set of visible states) at a point n in time on the basis of a set $\Lambda_{n+1}(s')$ of gain vectors $\alpha_{s',n+1}$ with respect to each visible state, s' (s'∈S) at a subsequent point n+1 in time.

7. The method of claim 6, further comprising generating a set $\Lambda_n(s)$ of gain vectors $\alpha_{s,n}$ further on the basis of a state transition probability of transition from one visible state, s to another visible state, s' and an expected gain in the visible state, s'.

8. The method of claim 1, wherein the acquisition includes obtaining a state transition probability $P^a_{s,i,s'}$ of transition from one visible state, s to another visible state, s' in a state set S when one action a is input in a hidden state i, and wherein the selection includes causing a transition from the visible state, s in response to execution of the action a selected in the action selection on the basis of the state transition probability $P^a_{s,i,s'}$ corresponding to the selected action a and the present probability distribution over the hidden states.

9. The method of claim 8, wherein the transition includes updating a probability distribution b over the hidden states on the basis of the state transition probability $P^a_{s,i,s'}$ and the present probability distribution over the hidden states.

10. The method of claim 9, further comprising updating the probability distribution b over the hidden states by determining a probability b(i) of the hidden state being i in response to the action selected in accordance with the expression:

$$b(i) = \frac{b(i)p^a_{s,i,s'}}{\sum_{j \in B} b(j)p^a_{s,j,s'}}$$

wherein $P^a_{s,i,s'}$ represents a state transition probability of transition from the visible state, s to the visible state, s' by the action, a, in the hidden state i and the visible state, s.

11. The method of claim 9, further comprising updating the probability distribution b over the hidden states by determining a probability b(i) of the hidden state being i in response to the action selected in accordance with the expression:

$$b(i) = \frac{b(i)p^a_{s,i;s',z}}{\sum_{j \in B} b(j)p^a_{s,j;s',z}}$$

where $P^a_{s,i,s'}$ represents a state transition probability of transition from the visible state, s to the visible state, s' and observation of observation z by the action, a, in the hidden state i and the visible state, s.

12. The method of claim 8, further comprising setting as the probability distribution for selection the probability distribution updated in the transition.

13. The method of claim 12, further comprising repeating:
executing the update of the probability distribution by selecting an action with respect to a predetermined time period; and
receiving the probability distribution updated by the selection method and updating the set of gain vectors by setting the probability distribution b as the probability distribution for selection.

\* \* \* \* \*